United States Patent [19]
Turpin et al.

[11] Patent Number: 5,167,684
[45] Date of Patent: Dec. 1, 1992

[54] PROCESS AND DEVICE FOR PRODUCING A HOLLOW OPTICAL FIBER

[75] Inventors: Marc Turpin, Bures sur Yvette; Jean-Pierre Le Pesant, Gie sur Yvette, both of France

[73] Assignee: Thomson-CSF, Puteaux, France

[21] Appl. No.: 620,045

[22] Filed: Nov. 30, 1990

[30] Foreign Application Priority Data

Dec. 1, 1989 [FR] France ............... 89 15872

[51] Int. Cl.[5] .......................... C03B 37/075
[52] U.S. Cl. ........................ 65/3.11; 65/13; 65/110
[58] Field of Search ......... 65/2, 3.11, 13, 110

[56] References Cited

U.S. PATENT DOCUMENTS

| | | |
|---|---|---|
| 2,608,722 | 9/1952 | Stuetzer . |
| 3,622,292 | 11/1971 | Fleck .................. 65/110 X |
| 3,792,985 | 2/1974 | Siefert et al. ............... 65/13 |
| 3,990,874 | 11/1976 | Schulman .............. 65/110 X |
| 4,046,537 | 9/1977 | Deserno et al. ............ 65/2 |
| 4,334,904 | 6/1982 | Apothaker et al. ....... 65/110 X |
| 4,551,162 | 11/1985 | Hicks ................ 65/13 X |
| 4,764,194 | 8/1988 | Maklad ................ 65/3.11 |

FOREIGN PATENT DOCUMENTS

| | | |
|---|---|---|
| 0198761 | 10/1986 | European Pat. Off. . |
| 0249886 | 12/1987 | European Pat. Off. . |
| 2516387 | 10/1976 | Fed. Rep. of Germany . |
| 53-38089 | 10/1978 | Japan ................. 65/110 |
| 62-162632 | 7/1987 | Japan ................. 65/110 |
| 753797 | 8/1980 | U.S.S.R. ............. 65/110 |

OTHER PUBLICATIONS

Patent Abstracts of Japan, vol. 8, No. 205, Sep. 19, 1984 & JP-A-59 092 940 (Furukawa Denki Kogyo K.K.) May 29, 1984.
Patent Abstracts of Japan, vol. 8, No. 138, Jun. 27, 1984 & JP-A-59 050 044 (Sumitomo Denki Kogyo K.K.) Mar. 22, 1984.
Patent Abstracts of Japan, vol. 8, No. 138, Jun. 27, 1984 & JP-A-59 050 043 (Sumitomo Denki Kogyo K.K.) Mar. 22, 1984.
Patent Abstracts of Japan, vol. 13, No. 417, Sep. 14, 1989 & JP-A-01 153 551 (Sumitomo Electric Ind. Ltd.) Jun. 15, 1989.
Patent Abstracts of Japan, vol. 10, No. 36, Feb. 13, 1986 & JP-A-60 186 432 (Sumitomo Denki Kogyo K.K.) Sep. 21, 1985.

Primary Examiner—Robert L. Lindsay
Attorney, Agent, or Firm—Oblon, Spivak, McClelland, Maier & Neustadt

[57] ABSTRACT

A process for producing an optical fiber comprising the following stages: a stage of production of a preform having an axis of symmetry and their ends and comprising an optical core as well as at least one cylindrical recess whose axis is parallel to the axis of symmetry of the preform; a drawing stage at a temperature making possible the softening of the drawn part of the preform to obtain a hollow optical fiber, characterized in that it comprises, after the preceding stage of production of the preform: a stage of attachment in a tight manner, to one end of the preform, of a hollow chamber whose cavity communicates with the recess of the preform. The cavity also communicates with a pneumatic regulation device. The drawing stage comprises a pneumatic regulation of the gas contained in the cavity and in the recess with the help of the pneumatic regulation device.

6 Claims, 4 Drawing Sheets

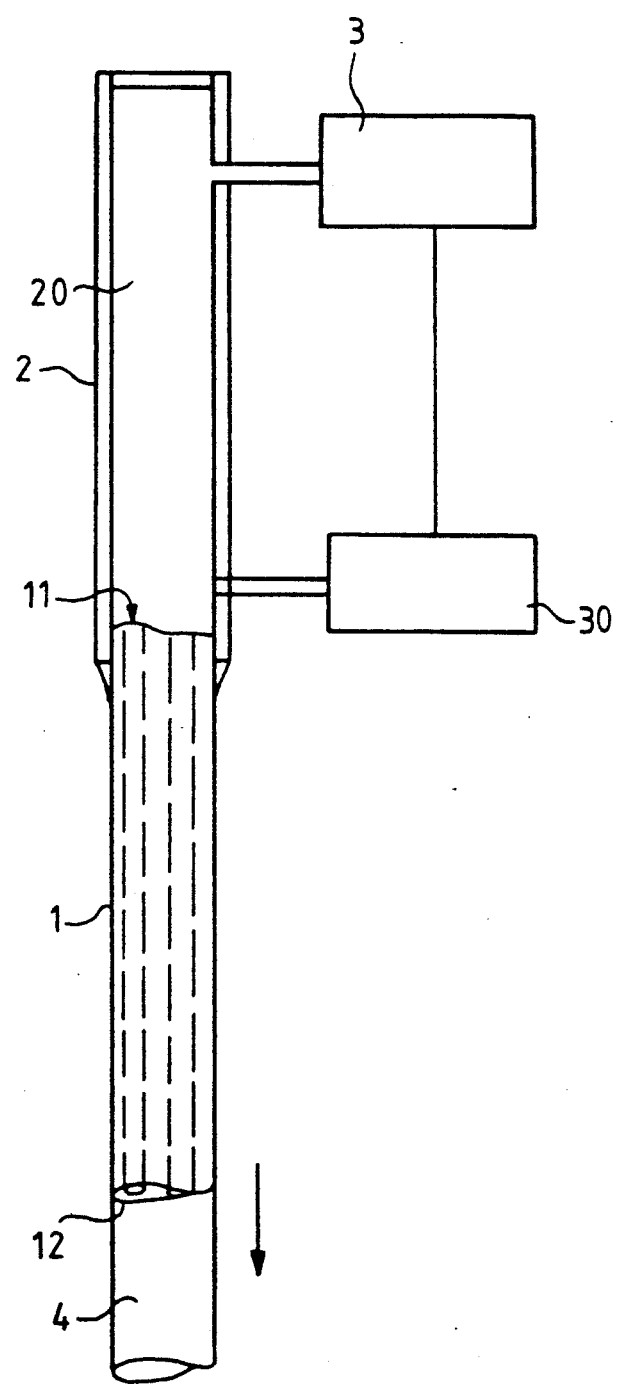
FIG_3

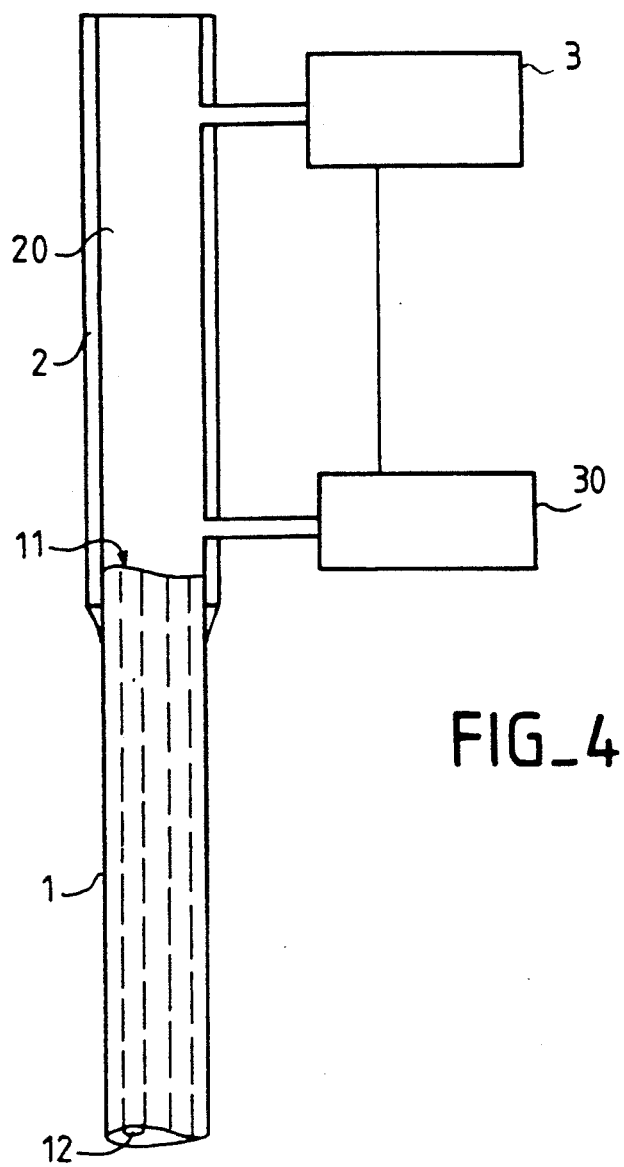
FIG_4

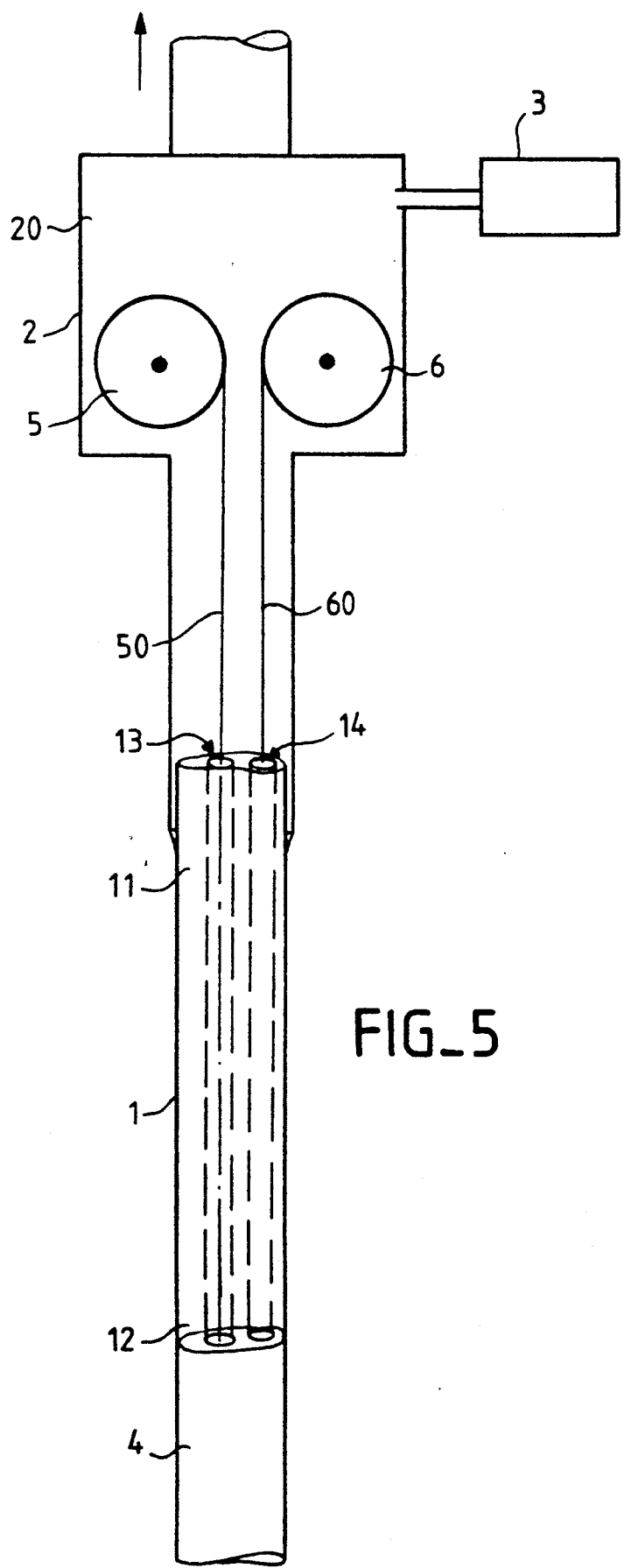
FIG_5

PROCESS AND DEVICE FOR PRODUCING A HOLLOW OPTICAL FIBER

BACKGROUND OF THE INVENTION

Field of the Invention

The present invention relates to a process for producing a hollow optical fiber and a device for producing an optical fiber using this process.

More particularly, the invention relates to embodiments of specific optical fibers intended for special applications in the area of optical fiber sensors.

These optical fibers make it possible to convey optical data according to the usual mode of operation of monomode optical fibers and they have an inner structure which promotes their sensitivity to such physical quantities as the pressure, the voltage and the electric field.

In a general manner and according to the invention, the optical fiber exhibits an anisotropic inner structure.

On both sides of the guide core, two recesses are made according to a production method of the present invention.

According to a first embodiment, the optical fiber with a hollow structure (FASE: fibre optique a structure evidee) is used as an intrinsic pressure sensor. In such a sensor, the fiber should exhibit a homogeneous structure over a great length (several hundred meters).

The invention describes a particular embodiment and a control method necessary for obtaining great lengths of homogeneous fiber.

According to a second embodiment, a method for obtaining optical fibers with conductive channels is described.

In the two recesses of the FASE fiber, there are placed conductive elements such as metal wires, which are inserted in the fiber during the fiber drawing operation according to a suitable variant, according to the invention, relative to the method known to one skilled in the art.

This type of optical fiber can be used for many applications, in particular in the area of optical fiber and/or integrated optical sensors. By way of a nonlimiting example, such a structure can be advantageously used to take advantage of the properties of the Kerr effect. It is known by one skilled in the art that an optical fiber of great length can be packaged in a small space, which, combined with the slight attenuation of the light signal, makes it possible to amplify cumulatively the effect over a great length, a slight effect or a low transducer coefficient.

SUMMARY OF THE INVENTION

Accordingly, an object of the present invention is to provide a novel process for producing a hollow optical fiber comprising the following stages:

a stage of production of a preform having an axis of symmetry, two ends, an optical core as well as at least one recess whose axis is parallel to the axis of symmetry of the preform;

a drawing stage at a temperature making possible the softening of the drawn part of the preform to obtain a hollow optical fiber, characterized in that it comprises, after the stage of production of the preform;

a stage of attachment in a tight manner, to one end of the preform, of a hollow chamber whose cavity also communicates with a pneumatic regulation device;

the drawing stage comprising a pneumatic regulation of the gas contained in the cavity and in the recess with the help of the pneumatic regulation device.

The invention also relates to a device for the production of a hollow fiber comprising a fiber drawing tower in which a preform comprising at least one recess is attached by a first end and is drawn by traction on the second end, characterized in that it comprises a hollow chamber attached in a tight manner to the first end and whose cavity communicates with the recess, pressure regulation means further being connected to the cavity to regulate the inner pressure of the cavity and the recess.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows an example of a device using the invention;

FIG. 4 shows the device of FIG. 3 during fiber drawing; and

FIG. 5 shows a variant of a device of the invention making possible the production of fibers containing conductive wires.

DESCRIPTION OF THE PREFERRED EMBODIMENTS

As a function of the usual parameters characteristic of the optical fibers, diameter, length, cutoff wave length, mode diameter, . . . , a preform (bar of large dimensions from which the optical fiber is drawn) is made according to any of the processes known to one skilled in the art, for example, MCVD (metal-organic compound vapor-phase epitaxy), OVD (outside vapor deposition), PVD (plasma vapor-phase epitaxy), VAD (axial vapor phase epitaxy).

The preform made is then mechanically machined according to a particular geometry by using standard machining processes. The form as well as the dimensions of the machinings are studied to obtain in the optical fiber, recesses whose size and position relative to the guide core are suited to the application.

Figure 1A:
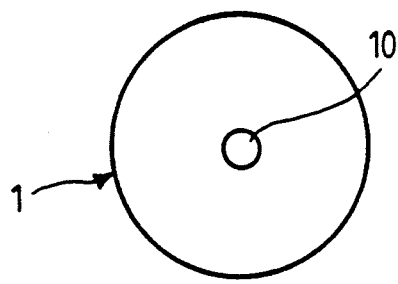
FIGS. 1(a)–2(b) show embodiments of preforms for the production of an optical fiber.

FIG. 1a represents the straight section of a preform 1 before machining.

Figure 1B:
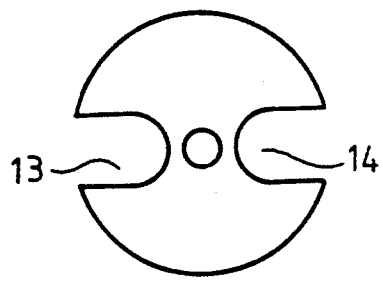
Figure 1C:
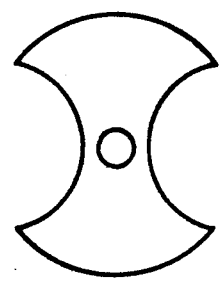

FIGS. 1b and 1c represent the straight sections of the preform after machining showing recesses 13 and 14. Two types of machining are represented by way of example.

Figure 2A:
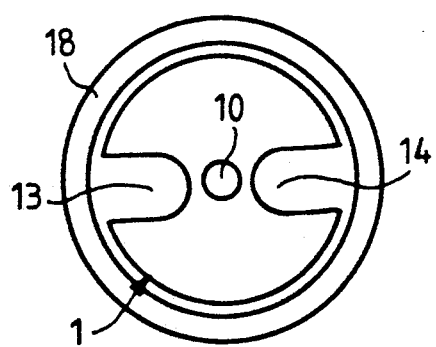

To obtain a quasi-homothetic structure of the desired fiber between the fiber and the preform, it is necessary to close the structure to obtain two recesses inside the preform. The preform machined with lateral grooves is coupled by a sleeve coupling with a silica tube 18 with an inside diameter which is slightly larger than the diameter of the preform, as is represented in FIG. 2a. The tube is then shrunk on the machined inner part, according to the usual flame shrinking technique used in the MCVD technique, for example.

Figure 2B:
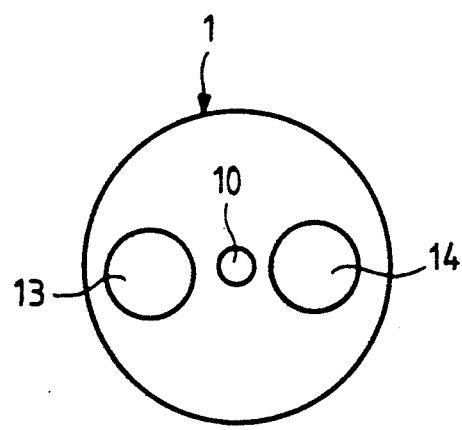

In this production stage, a new preform that can be fiber-drawn, of which a diagrammatic representation is given in FIG. 2b, is available.

The choice of relative dimensions of the machined preform and of the tube as well as the shrinking conditions (heating power, inner pressure control), is decisive for obtaining a pre-recircularization of the new preform, in particular at the level of the recesses.

The fiber drawing of the preform is performed on a standard fiber drawing tower comprising the usual equipment and control means.

According to the invention, special arrangements for regulation of the pressure inside the preform are provided to assure a homogeneous fiber drawing, namely a control of the size and the position of the recesses in the optical fiber as a function of the length of the drawn fiber.

Without regulation, the pressure variations in the recesses do not make it possible to control the size of the recesses over lengths greater than several tens of meters (which is very insufficient taking into account potential lengths which can be drawn from the same preform) when the preform is sealed at its two ends.

Conversely, if the recesses come out (in the atmospheric pressure), the structure will collapse in passing through the fiber drawing furnace.

According to the invention, to obtain the homogeneity of the structure of the preform which is machined and coupled by a sleeve coupling, the latter is kept at the upper level by a system which makes it possible to control the inner pressure during the fiber drawing.

FIG. 3 represents an arrangement for using the invention. The arrangement comprises a chamber 2 attached in a tight manner to an upper part 11 of the preform 1. Cavity 20 of the chamber 2 communicates with the recesses 13 and 14 of the preform as well as with a gas intake and pressure regulation system 3.

The pressure regulation system is obtained by a gas flow (preferably a neutral gas, for example, argon, to avoid any pollution by chemical reaction) injected into the chamber and regulated by a pressure gage 30.

According to an embodiment of the present invention, chamber 2 is made from a tube welded to the upper part of the preform. The upper part of the tube of chamber 2 is closed and is used for keeping at the level of the apparatus for descent of the preform for the same reason as the silica bar is usually used for any standard fiber drawing operation. On the side wall of the tube of chamber 2 are connected the gas injection and pressure control system 3 and pressure gage 30 making it possible to regulate the operation of the system 3. As represented in FIG. 3, a part 4, called a primer, is attached to an end 12 of the preform to make possible the drawing of the preform at the beginning of the drawing operation. This primer is of the same outside diameter as the preform, of a similar material and plugs the recesses 13 and 14 at end 12.

By way of a process example, a slight excess pressure (equivalent to a water level of several tens of millimeters) is sufficient to control the structure of the fiber at the level of the recesses on the one hand and at the level of the recircularization of the structure. This recircularization phenomenon is known and used for the production of certain types of specific polarization-preserving fibers (it takes into account such parameters as the temperature, the voltage and the fiber drawing speed).

This hollow structure fiber type exhibits an intrinsic birefringence linked to the dissymmetric structure. The value of the birefringence is linked to the stresses and the deformations of the guide core. The control of the homogeneity of the structure is therefore essential to control the birefringence of the fiber. This parameter is very important and even essential for the applications characteristic of the optical fiber sensors. We recall that this type of optical fiber is particularly well-suited to the measurements of static or dynamic pressures.

The dimension of the recesses is adjusted as a function of the applied pressure. The automatic control of the pressure during the fiber drawing makes it possible to obtain fiber lengths of several hundreds of meters (length limited by the length of the preform) exhibiting a perfect uniformity of the diameter of the recesses.

The embodiment is indicated by way of nonlimiting example. Actually, the entire pressure control part is located above the fiber drawing furnace, in an area at ambient temperature. At this level, the use of metal materials or other materials to produce the system is not to be proscribed.

From a preform with a hollow structure such as the one described above, the invention also relates to a production process to obtain a monomode optical fiber having two conductive elements on both sides of the guide core.

It is important to specify that the electric conductors are placed inside the optical fiber.

The production method consists in using the pressure control apparatus described above, modified so that it can receive in the pressure regulation chamber a subassembly making it possible to unwind by pulling two metal wires previously inserted in the recesses of the preform.

Taking into account the high fiber drawing temperature necessary for the optical fibers with a silica base, metals are chosen whose melting point is considerably higher than the fiber drawing temperature.

To clarify our idea, the fiber drawing temperature is between 1500° and 1800° C. (depending on the components of the fiber . . . ), wires of tungsten, tantalum, molybdenum, . . . can be used.

In a general manner, any conductive material resistant to a temperature on the order of 2000° C. and suitable for spinning in small diameters on the order of 5 to 25 micrometers can be used.

The diagram of FIG. 5 illustrates a device for using the invention.

The details relative to the subsystem of unwinding are not described, the latter not modifying the primary nature of the invention.

On the basis of the usual dimensions of optical fibers with a silica base, for example, an outside diameter of 125 micrometers, recesses whose diameter is on the order of twenty to forty micrometers can be produced, the conductive wires can be "free" inside the recesses.

The device of FIG. 5 comprises, in chamber 2, two wire coils 5 and 6.

As has been described above, preform 1 is attached in a tight way by its end 11 to chamber 2. Cavity 20 of the chamber and recesses 13, 14 are regulated in pressure by device 3.

Wires 50 and 60 of the coils are attached in recesses 13 and 14 of preform 1 and have their free end attached to end 12 of the preform. According to FIG. 5, the ends of the wires are attached to primer 4 which is used to seal recesses 13 and 14 and to pull the preform at the beginning of the fiber drawing operation.

The descent by gravity of the starting bar pulls metal wires 50, 60 with the optical fiber. During the fiber drawing, the usual automatic control systems are put into operation, as well as the pressure control system.

The metal wire coils are mounted on the axes of rotation to make possible an unwinding without tension and to prevent the breaking of the wires during the process. Motors "without torque" can be added for a better control of the unwinding.

Usually, the straight sections of the preform and of the fiber obtained have circular shapes. The recesses also have a circular shape. However, both the preform and the fiber obtained, as well as the recesses, can have any other shape, particularly elliptical.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Process of production of a hollow optical fiber comprising the steps of:
    producing a preform having an axis of symmetry, two ends, an optical core, and at least one recess having an axis which is parallel to the axis of symmetry of the preform;
    attaching a hollow chamber having a cavity which communicates with the at least one recess of the preform to one end of the preform, said cavity also communicating with a pneumatic regulation device;
    drawing the preform at a temperature which causes a softening of a drawn part of the preform to obtain a hollow optical fiber; and
    attaching a primer having an outside diameter which is the same as an outside diameter of the preform and of a material having the same melting temperature as the preform to the other end of the preform so as to seal this end of the at least one recess;
    wherein said drawing step comprises the further step of:
        pneumatically regulating a gas contained in the cavity and in the at least one recess; and
    the pneumatic regulation device is a pressure regulation device such that the pneumatically regulating step comprises a regulation of the pressure of the gas contained in the cavity and in the at least one recess.

2. A device for producing a hollow fiber, comprising:
    a preform having an axis of symmetry, two ends, an optical core, and at least one recess having an axis which is parallel to the axis of symmetry of the preform;
    a hollow chamber attached to one end of the preform and having a cavity which communicates with the at least one recess of the preform;
    pressure regulating means connected to the cavity for regulating an inner pressure of the cavity and the recess;
    primer means attached to the other end of the preform for sealing the other end of said at least one recess; and
    at least one wire coil for each recess of the preform, a wire of said at least one wire coil extending along the axis of the recess and being attached by one end to the primer, said at least one wire coil being positioned inside the cavity of said chamber.

3. Process according to claim 1, wherein the cavity of the chamber contains at least one wire coil for each recess of the preform, the wire of one coil being placed along the axis of a recess and attached by one end to the primer.

4. Process according to claim 1, wherein the chamber is welded to the preform.

5. Process according to claim 1, wherein the preform comprises two recesses located on both sides of the optical core of the preform.

6. Process according to claim 3, wherein the wire is of a metal material with a melting temperature greater than the melting temperature of the preform.

* * * * *